US010443684B2

(12) United States Patent
Chern

(10) Patent No.: US 10,443,684 B2
(45) Date of Patent: Oct. 15, 2019

(54) BALANCE GEAR WITH A SHOT DAMPER

(71) Applicant: Ford Global Technologies, LLC, Dearborn, MI (US)

(72) Inventor: Jim Chern, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 52 days.

(21) Appl. No.: 15/866,874

(22) Filed: Jan. 10, 2018

(65) Prior Publication Data

US 2019/0211900 A1 Jul. 11, 2019

(51) Int. Cl.
*F16F 15/36* (2006.01)
*F16F 7/01* (2006.01)
*F16F 15/26* (2006.01)
*F16F 15/28* (2006.01)

(52) U.S. Cl.
CPC ............ *F16F 15/363* (2013.01); *F16F 7/015* (2013.01); *F16F 15/264* (2013.01); *F16F 15/283* (2013.01); *F16F 2226/045* (2013.01); *F16F 2230/0011* (2013.01); *F16F 2232/02* (2013.01)

(58) Field of Classification Search
CPC ........ F16F 15/363; F16F 15/283; F16F 7/015; F16F 15/264; F16F 2232/02; F16F 2230/0011; F16F 2226/045
See application file for complete search history.

(56) References Cited

U.S. PATENT DOCUMENTS

| 5,078,575 | A | 1/1992 | Haas et al. |
| 6,311,582 | B1 * | 11/2001 | Chow ............... B25D 1/12 81/20 |
| 6,626,139 | B1 * | 9/2003 | Horita ............... F16F 15/12 123/192.2 |
| 6,802,405 | B2 | 10/2004 | Barcock et al. |
| 7,004,294 | B2 | 2/2006 | Williams |
| 9,121,466 | B2 | 9/2015 | Tsugihashi et al. |
| 9,410,597 | B2 | 8/2016 | Manzoor |

(Continued)

FOREIGN PATENT DOCUMENTS

| CN | 201145021 Y | 11/2008 |
| CN | 101725656 A | 6/2010 |
| CN | 202165556 U | 3/2012 |

(Continued)

OTHER PUBLICATIONS

U.S. Appl. No. 15/643,627, entitled "Counterbalance Gear With Shot Damper", filed Jul. 7, 2017, 26 pages.

*Primary Examiner* — Jacob M Amick
*Assistant Examiner* — Charles Brauch
(74) *Attorney, Agent, or Firm* — Brooks Kushman P.C.; Geoffrey Brumbaugh

(57) ABSTRACT

An engine system has a balance gear coupled to a balance shaft. The balance gear is formed by a disc having first and second opposite sides extending radially outwardly to a circumferential edge defining a series of teeth, with a first sector of the disc having a first aperture therethrough, and a second opposite sector of the disc having a second aperture therethrough. A damper is positioned within the second aperture and extends across the disc. The damper has a container enclosing a plurality of particles therein. Opposed ends of the container are outboard of the first and second sides of the disc. A method of forming the balance gear is also provided.

20 Claims, 7 Drawing Sheets

(56) References Cited

U.S. PATENT DOCUMENTS

2010/0294063 A1 11/2010 Schroth et al.
2016/0017955 A1 1/2016 Sajdowitz et al.

FOREIGN PATENT DOCUMENTS

| CN | 102410355 | A | * | 4/2012 |
| CN | 102410355 | A | | 4/2012 |
| CN | 104141768 | A | | 11/2014 |
| CN | 104196955 | A | * | 12/2014 |
| CN | 104196955 | A | | 12/2014 |
| JP | H06288463 | A | * | 10/1994 |
| JP | H06288463 | A | | 10/1994 |
| WO | 2010117069 | A1 | | 10/2010 |

\* cited by examiner

BALANCE GEAR WITH A SHOT DAMPER

TECHNICAL FIELD

Various embodiments relate to a gear such as a balance gear or counterbalance gear for use with a balancing shaft for an engine.

BACKGROUND

Gear drive systems may exhibit tonal noises and vibrations at the harmonics of the gear meshing frequency, for example, due to a change of the contact forces between the drive and driven gears as the gears rotate. The gear-to-gear interaction may result in noise commonly referred to as gear whine. Gear whine may be caused by the transmission error between meshing teeth of the two gears and depend on factors including torsional load, gear design, tooth profile, total number of teeth, number of contacting teeth, gear mass, and inertia. Gear whine may be increased in cases with high torsional excitations and may be further exacerbated at various orders or harmonics based on the system dynamic. In one example, gear whine may be exacerbated during twisting and/or bending modes and resonances of the gear.

SUMMARY

In an embodiment, an engine system is provided with a crankshaft gear coupled to a crankshaft of an engine for rotation therewith, a balance gear, and a damper. The balance gear is coupled to a balance shaft for rotation therewith, and the balance gear and crankshaft gear are in meshed engagement. The balance gear is formed by a disc having first and second opposite sides extending radially outwardly to a circumferential edge defining a series of teeth, with a first sector of the disc having a first aperture therethrough, and a second opposite sector of the disc having a second aperture therethrough. The damper is positioned within the second aperture and extends across the disc. The damper has a container enclosing a plurality of particles therein.

In another embodiment, a gear for a vehicle shaft is provided by a disc having first and second opposite sides extending radially outwardly to an edge defining a series of teeth. The disc has a first sector defining an aperture therethrough. A closed container is positioned in the aperture and contains particles, and opposed ends of the container are outboard of the first and second sides of the disc.

In yet another embodiment, a method of forming a balance gear for a vehicle balance shaft is provided. A disc is formed and has first and second opposite sides extending radially outwardly to a circumferential edge. A series of teeth are formed on the circumferential edge. An aperture is formed through the disc and adjacent to the circumferential edge. A damper housing is positioned into the aperture. The damper housing has an interior region defined by a circumferential side wall extending from an end wall to an edge region, with the side wall contacting a wall of the aperture. A plurality of shot particles is provided into the interior region of the damper housing to a specified fill fraction. A cover plate is attached to the edge region of the side wall of the damper housing to enclose the interior region, retain the plurality of shot particles therein, and form a damper in the balance gear.

DETAILED DESCRIPTION

As required, detailed embodiments of the present disclosure are provided herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
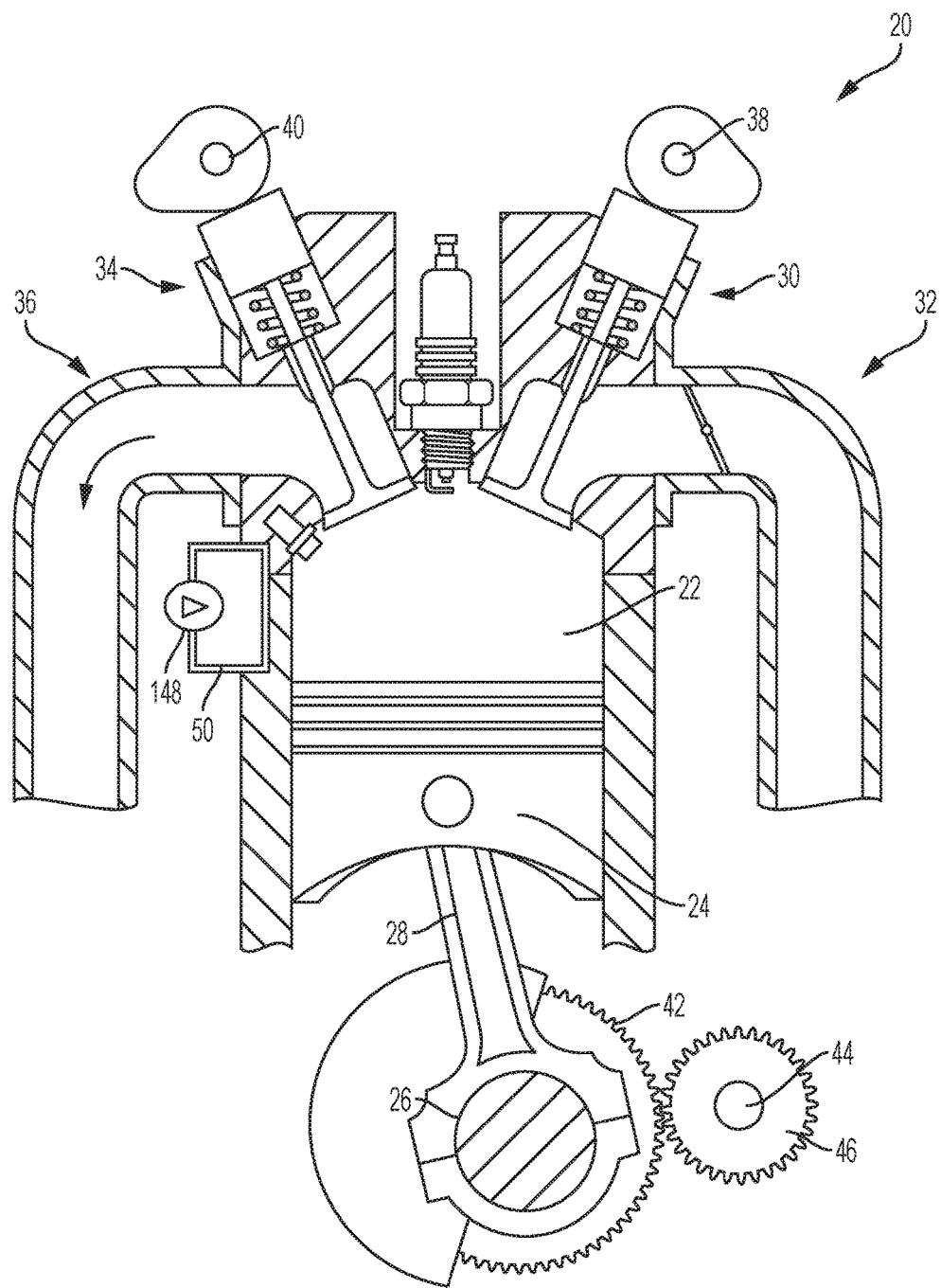
FIG. 1 illustrates a schematic of an internal combustion engine configured to implement various embodiments according to the present disclosure.

FIG. 1 illustrates a schematic of an internal combustion engine system 20 configured to implement various embodiments according to the present disclosure. In some embodiments, the engine 20 is used as the sole prime mover in a vehicle, such as a conventional vehicle, or a stop-start vehicle. In other embodiments, the engine may be used in a hybrid vehicle where an additional prime mover, such as an electric machine, is available to provide additional power to propel the vehicle.

The engine 20 has a cylinder block and a cylinder head that cooperate to define a plurality of cylinders 22, with one cylinder is illustrated. The engine 20 may have one cylinder, two cylinders, three cylinders, four cylinders, or more than four cylinders. A piston 24 is positioned within each cylinder and is connected to a crankshaft 26 via a connecting rod 28.

One or more intake valves 30 controls flow from an intake manifold 32 into the cylinder 22. One or more exhaust valves 34 controls flow from the cylinder 22 to an exhaust manifold 36. The intake and exhaust valves 30, 34 may be operated in various ways as is known in the art to control the engine operation. The engine 20 is illustrated as having the intake valve 30 and exhaust valve 34 each with an associated camshaft 38, 40, respectively, in a direct overhead cam configuration. The engine and valves 30, 34 may be configured in various manners as is known in the art, for example, as a single overhead camshaft, dual overhead camshaft, direct camshaft actuation, an overhead valve configuration with the valves operated by pushrods or rockers, and the like. The camshafts 38, 40 may be rotationally connected to and driven by the crankshaft 26, and in one embodiment, are driven by a gear train according to the present disclosure as described below.

Each cylinder 22 may operate under a four-stroke cycle including an intake stroke, a compression stroke, an ignition stroke, and an exhaust stroke. In other embodiments, the engine may operate with a two-stroke cycle. The piston 24 position at the top of the cylinder 22 is generally known as top dead center (TDC). The piston 24 position at the bottom of the cylinder is generally known as bottom dead center (BDC).

During the intake stroke, the intake valve(s) 30 opens and the exhaust valve(s) 30 closes while the piston 24 moves from the top of the cylinder 22 to the bottom of the cylinder 22 to introduce air from the intake manifold to the combustion chamber.

During the compression stroke, the intake and exhaust valves 30, 34 are closed. The piston 24 moves from the bottom towards the top of the cylinder 22 to compress the air within the combustion chamber.

Fuel is then introduced into the combustion chamber and ignited. The engine may be provided as a spark ignition engine or as a compression ignition engine. During the expansion stroke, the ignited fuel air mixture in the combustion chamber expands, thereby causing the piston 24 to move from the top of the cylinder 22 to the bottom of the cylinder 22. The movement of the piston 24 causes a corresponding movement in crankshaft 26 and provides for a mechanical torque output from the engine 20.

During the exhaust stroke, the intake valve(s) 30 remains closed, and the exhaust valve(s) 34 opens. The piston 24 moves from the bottom of the cylinder to the top of the cylinder 22 to remove the exhaust gases and combustion products from the combustion chamber by reducing the volume of the chamber. The exhaust gases flow from the combustion cylinder 22 to the exhaust manifold 36.

The intake and exhaust valves 30, 34 positions and timing, as well as the fuel injection timing and ignition timing may be varied for the various engine strokes.

The crankshaft 26 may be provided with a crankshaft gear 42 or drive gear. A balance shaft 44 may be provided with a balance gear 46 or driven gear in meshed engagement with the drive gear 42. The crankshaft 26 may have additional drive gears mounted thereon, or gear trains in meshed engagement with the drive gear to drive other engine or vehicle systems according to the present disclosure, including gear trains to drive the camshafts 38, 40, a pump 48 in a cooling or lubricating system 50 for the engine, a fuel pump, a supercharger or other forced induction system, a vacuum pump, an alternator, and the like.

Figure 2:
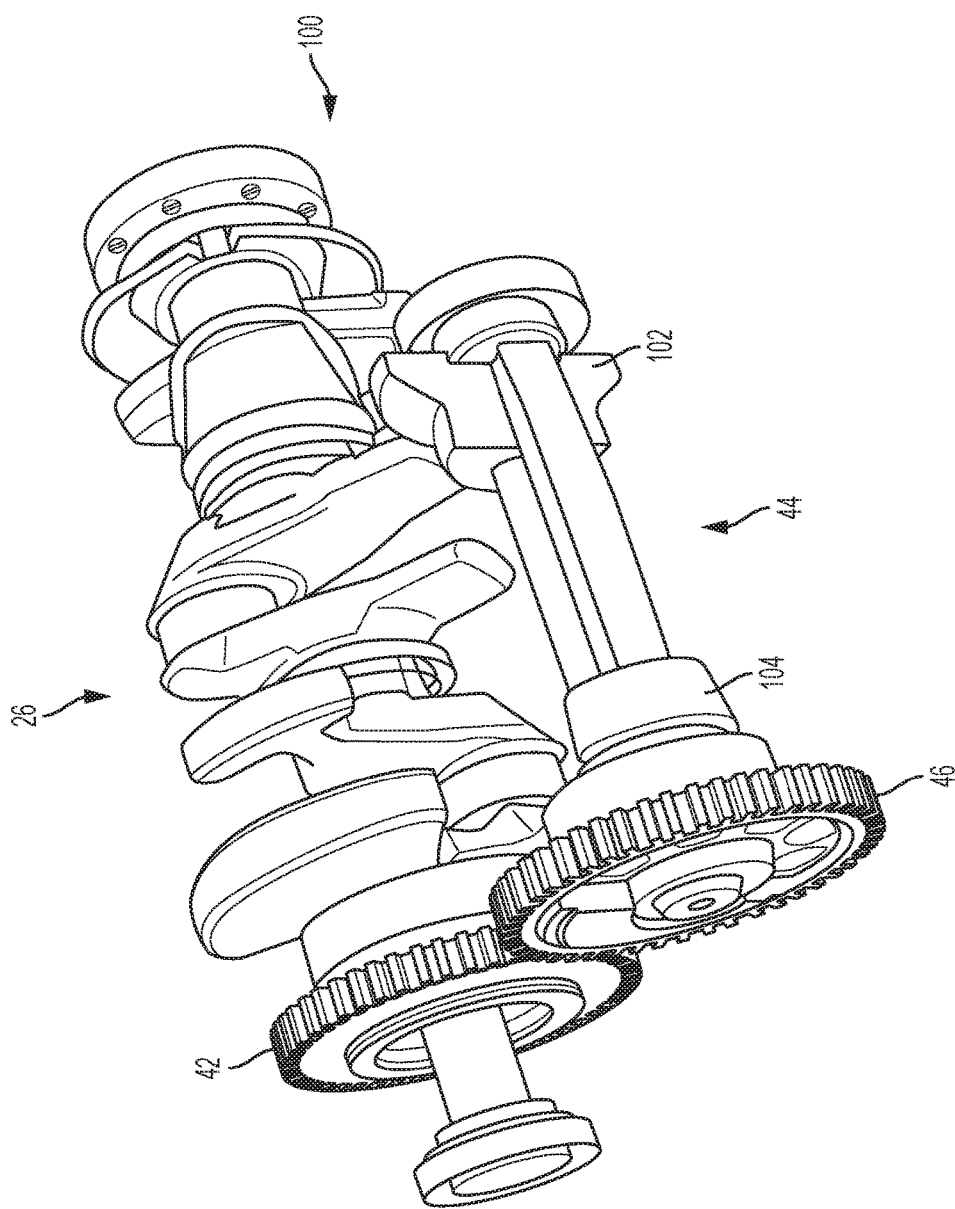
FIG. 2 illustrates a perspective view of a crankshaft and balance shaft assembly for the engine of FIG. 1.

FIG. 2 illustrates a perspective view of a crankshaft and balance shaft assembly 100 according to an embodiment and for use with the engine 20 of FIG. 1. Elements in FIG. 2 have the same reference numbers as similar elements in FIG. 1. The balance shaft 44 may be provided for an engine with asymmetry. For example, in an engine with one or more cylinders, the movement of the connecting rods may be asymmetrical throughout the crankshaft 26 rotation. For example, during a given period of crankshaft rotation, the descending and ascending pistons are not always completely opposed or balanced in their movement and acceleration, which results in inertial forces and/or couples or moments with each crankshaft revolution that may additionally increase with increasing engine and crankshaft speed. Based on the configuration of the engine and the number and arrangement of the cylinders, an inherent second order couple may be caused by the asymmetrical connecting rod movement, or an inherent second order force may be caused by the asymmetrical connecting rod movement.

The crankshaft 26 is shown as having a drive gear 42 or crankshaft gear coupled thereto for rotation therewith. The balance shaft 44 extends parallel to the crankshaft 26 and is eccentrically weighted. The size and positioning (radial and longitudinal) of the counterweights on the balance shaft may be determined based on the level of the couples or forces that need to be balanced. The balance shaft 44 shown has two eccentric counterweights 102, 104 or equal masses oriented at 180 degrees or opposite from each other, and placed at a certain distance from each other along the length of the balance shaft. In one example, the weight 102 is formed as an integral part of the balance shaft 44, and in other examples, is a weight 102 that is connected to the balance shaft 44 for rotation therewith. Eccentric weighting for the shaft 44 may be also integrated into and provided at least in part by an eccentrically weighted balance gear 46.

The balance shaft 44 has a driven gear 46 or balance gear connected thereto for rotation therewith, e.g. using a splined connection or the like. The drive gear 42 of the crankshaft is in meshed engagement with the driven gear 46 of a balance shaft such that rotation of the crankshaft 26 drives the balance shaft 44. The drive gear 42 and driven gear 46 may be selected to provide the desired gear ratio, and speed ratio for the balance shaft compared to the crankshaft. The drive gear 42 and driven gear 46 are provided as intermeshed spur gears or intermeshed helical gears. In some embodiments, the drive gear 42 and driven gear 46 are further provided as scissor gears to provide a biasing force to maintain engagement gears.

FIGS. 3-6 illustrate a driven gear 46 according to an embodiment of the present disclosure. Elements in FIGS. 3-6 are given the same reference numbers as similar elements in FIGS. 1-2 for simplicity. It is envisioned that the driven gear 46 as described herein may be used as a counterweighted gear or gear in other vehicle applications, to counteract gear whine relating to gear flexibility. The driven gear 46 is connected to the nose or end region of the balance shaft 44 in FIGS. 1-2.

The driven gear 46 is counterweighted or eccentrically weighted to provide counterweight for the balance shaft 44 or additional counterweight for the balance shaft 44. A particle damper 150 or shot damper is provided into the flank 152 of the gear in a counterweight region 154 or imbalance mass of the gear. The shot damper 150 has a plurality of particles 156 or shot, which may be provided by small steel balls provided inside a container connected to the gear 46. Energy created by the flexible modes of the gear 46 is dissipated by friction losses, ball-to-ball impacts, and ball-to-gear wall impacts. The shot damper 150 provides for a broadband dissipation of noise, vibration, and harshness (NVH), and is not tuned to a specific frequency.

The driven gear 46 or balance gear is formed by a disc 160 or disc member with first and second opposite sides 162, 164. The disc member 160 and first and second sides 162, 164 extend radially outwardly from a central aperture 166 to a circumferential edge 168 of the disc. The circumferential edge 168 of the disc extends between the first and second sides 162, 164 of the disc, and provides an outer perimeter of the balance gear 46. The outer circumferential edge 168 defines a series of teeth 170, and the teeth may be provided as teeth for a spur gear, a helical gear, or other gear type. In one example, as shown, the circumferential edge 168 extends generally perpendicularly to the first and second sides 162, 164, and parallel with the central aperture 166. In other examples, the circumferential edge 168 may be angled relative to the first and second sides 162, 164 and the central aperture 166, for example, as a bevel gear.

The body of the balance gear 46, or gear flank, has a first sector 176 and a second sector 178. In one example, the first and second sectors 176, 178 cooperate to provide 360 degrees of the body such that they are the only two sectors for the gear 46. The first sector 176 and second sector 178 are generally opposite one another.

The first sector 176 of the disc has at least one aperture 180 formed therethrough and intersecting the first and second sides 162, 164. In other examples, as shown, the first sector 176 of the disc has a series of apertures 180 formed therethrough to intersect the first and second sides 162, 164 of the disc. The apertures 180 of the first sector 176 extend radially outward from the central bore 166 to remove mass from the disc 160 away from the longitudinal or rotational axis 182 of the gear. In further examples, the apertures 180 in the first sector 176 may be replaced by or provided in conjunction with recesses or slots intersecting one of the first and second sides 162, 164 to remove material from the body of the balance gear 46 in the first sector 176 away from the rotational axis 182.

The second sector 178 of the disc has a second aperture 184 formed therethrough and intersecting the first and second sides 162, 164. The aperture 184 is positioned radially outward from the central bore 166 and removes mass from the disc 160 away from the longitudinal or rotational axis 182 of the gear. The second aperture 184 may be radially opposite to an aperture of the first sector, for example, for balance.

A particle damper 150 or shot damper is connected to the second sector 178 of the gear. The damper 150 is positioned within and extends through the second aperture 184, and across the disc. The final weight of the particle damper 150 may be sized to provide the same weight as the mass of material removed from the gear flank 152 to form the second aperture 184.

The particle damper 150 is formed by a container 190 that is inserted into the second aperture 184 and is supported by the wall forming the second aperture 184. The damper 150 is provided by a closed container. The container 190 encloses a plurality of particles 156 within an interior region 192 of the container.

The container 190 has a base 194 or a housing. The base 194 is formed by a side wall 196 connected to an end wall 198. The side wall 196 and the end wall 198 cooperate to define an interior region 192 for the base. The side wall 196 may extend away from the end wall 198 and be provided along the peripheral edge or outer circumference of the end wall. The end wall 198 may be circular as shown, such that the side wall 196 is cylindrical. An outer surface of the side wall 196 is sized and shaped to be received by the aperture 184. An inner surface of the end wall 198 may be planar as shown or may be angled, curved, or v-shaped. In other examples, the damper 150 may have other sizes or cross-sectional shapes, including semi-circular, triangular, square, rectangular, polygonal, and complex including convex and concave curves.

The container 190 has a cover 200. The cover 200 is connected or attached to the base 194 to enclose the interior region 192 of the container. The cover 200 is connected to the side wall 196 opposite to the end wall 198, e.g. at an edge region of the side wall. The cover 200 and end wall 198 may be parallel to one another. The cover 200 and the end wall 198 may also be parallel to and offset from the first and second opposed sides 162, 164 of the disc. The cover 200 may be connected to the base 194 using a welding process or the like. In other examples, the cover may be connected to the base using fasteners and a sealing member such as an o-ring. The cover and base cooperate to form a fluid tight seal, for example, to prevent lubricant or other fluids from entering the damper during use.

The cover 200 and/or the edge region of the side wall 196 may be provided with angled surfaces or the like that interface with one another such that the cover 200 is located relative to the base 194 when positioned for attachment. In one example, and as shown, the cover 200 has a protrusion on the inner face 202 of the cover that extends into the interior region 192 of the base.

Figure 4:
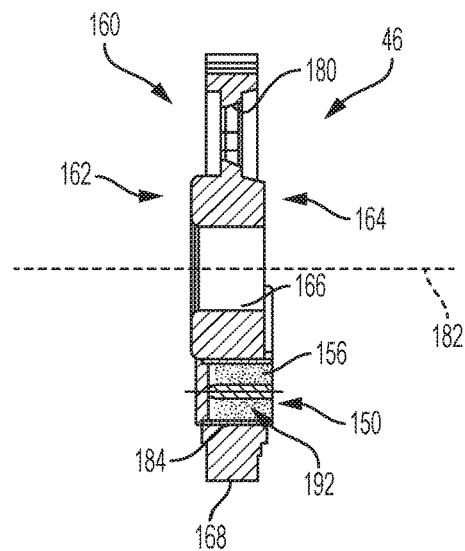
FIG. 4 illustrates a sectional view of the balance gear of FIG. 3.
Figure 5:
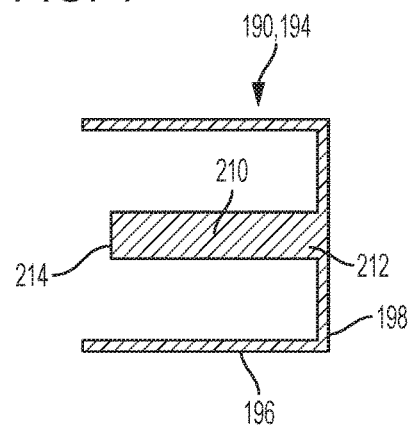
FIG. 5 illustrates a sectional view of a container for use with the balance gear of FIG. 3.
Figure 6:
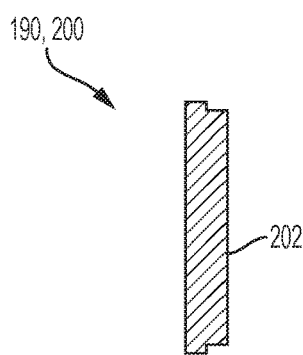
FIG. 6 illustrates a sectional view of a cover for use with the balance gear of FIGS. 3 and 5.

The damper 150 has one or more stirring members 210 positioned within the interior region 192 of the container. In one example, and as shown, the damper 150 has a single stirring member 210 or bar. The stirring member 210 may be connected to the end wall 198 and spaced apart from the side wall 196 to extend across the interior region of the damper housing 194. The stirring member 210 may be a central stirring member such that it is concentrically arranged with the side wall 196. The stirring member 210 extends from a first end 212 to a second end 214. The first end 212 is connected to the end wall 198, and the second end 214 is adjacent to the cover 200. In one example, the second end 214 contacts the inner face 202 of the cover when the cover is attached to the base as shown in FIG. 4. The central stirring member 210 may be provided as a cylindrical rod. In other examples, the central stirring member 210 may have other shapes and/or sizes, the stirring member may be positioned at another location within the interior region of the container, and/or multiple stirring members may be present. In further examples, the damper 150 may be provided without any stirring members.

The container 190 is positioned within the second aperture 184 such that the end wall 198 of the damper is positioned outboard of the second side 164 of the disc. The cover 200 of the damper is positioned outboard of the first side 162 of the disc when attached to the base. In other words, opposed ends 198, 200 of the container are outboard of the first and second sides 162, 164 of the disc. The container 190 is necessarily larger in volume than the matter removed from the disc to form the aperture 184, as the container 190 is only partially filled with particles 156 or shot. In order for the damper 150 to provide the same weight and mass as the material removed from the gear disc to form the aperture, it needs to extend outside and outboard of the gear flank of the disc.

A plurality of particles 156 is positioned within the interior region 192 to provide the damper. The plurality of particles 156 may be provided by shot, and may be in the form of spherical balls. The plurality of particles 156 or shot may each be formed from a metal or metal alloy. In the example shown, the shot is provided by steel balls, which have both the material properties necessary for repeated impacts and the high operating temperature, and the density to contribute to the imbalance mass of the gear.

In one example, the plurality of particles 156 is positioned in the base 194 and the cover 200 is attached to the base before the damper 150 is connected to the gear 46. In one example, the container 190 is closed and sealed prior to connecting the damper 150 to the gear 46. In another example, the base 194 is connected to the gear 46, filled, and then the cover 200 is connected to the base 194.

The cover 200 and the base 194 cooperate to define an internal volume of the interior region 192 for the damper. The damper 150 is sized to improve the NVH performance by controlling the size or volume of the damper including empty volume, the shape of the damper container and positioning of any stirring members, the size or diameter of the particles 156 or shot, the location of the container and damper 150 on the gear 46, and the clearance of the shot-filled damper 150, as known as a fill fraction. Primary factors affecting the performance of the damper 150 may be the volume of the damper, the surface area of the container available for contact with the particles for energy dissipation, and the clearance or fill fraction of the damper. The damper 150 is generally positioned in the gear to be near the deformation region, e.g. radially outboard, and away from the rotational axis 182 of the gear. Generally, the performance of the damper 150 is increased with increasing damper volume.

The base 194 and cover 200 of the damper, and the stirring members 210 may be formed from a metal or a metal alloy. In one example, the base 194 and cover 200 of the damper are formed from steel, aluminum, or an aluminum alloy. In a further example, the base 194 and cover 200 are formed from the same material as the gear, e.g. steel, which provides a similar thermal expansion coefficient between the gear and the damper, as well as the ability to press fit and/or weld the damper in place on the gear.

A predetermined amount or volume of the particles 156 are provided in the interior region 192. In one example, an amount or volume of particles 156 is provided such that they fill more than fifty percent of the volume of the closed damper 150. In a further example, the particles are provided to fill 90-95 percent of the volume of the damper as a fill fraction such that 5-10 percent of the damper volume is left as unfilled space or open space. The shot particles 156 may have a diameter ranging from less than a millimeter to five millimeters. In one example, the particles 156 have a diameter from a half a millimeter to two millimeters.

In various embodiments, and as shown, the container 190 is provided as the sole container and sole damper 150 in the gear. In other embodiments, multiple dampers 150 may be provided and symmetrically arranged on the gear 46. For example, the gear 46 may be provided without aperture(s) 80 that provide a counterweighted gear, and the dampers 150 may be provided as one or more pair of dampers, with each pair having its dampers symmetrically arranged across the central bore 166 from one another on the gear.

In one example, an existing, conventional counterweight gear or other gear is post-processes or retrofitted to include a damper 150 according to the present disclosure. As the damper 150 fits into an aperture 184 formed in the gear, the resulting modified and damped gear has a similar size and shape envelope to allow for continued use in its application with reduced NVH. Additionally, as the damper 150 is incorporated into the flank 152 of the gear, the resulting gear and damper may be used in applications with gear packaging constraints.

The series of apertures 180 in the first sector 176 and the damper 150 and gear flank in the second sector 178 cooperate to provide the eccentric weighting of the balance gear 46. As the first sector 176 has less structure than the second sector 178, the balance gear 46 has an increased degree of flexibility. As the gear 46 undergoes some degree of flexing or movement, the forces between the intermeshed teeth between the crankshaft gear and the balance gear will likewise change and vary, and whine may be increased or amplified. This flexibility may result in movement of the gear 46 during rotation, and may provide degrees of gear movement. In one example, the gear has a first order bending mode, and a second order twisting mode. The bending mode may also be referred to as "potato chipping" or resembling a hyperbolic paraboloid or other saddle or complex shape.

The bending and twisting modes of the gear 46 may be self-coupling and have resonant frequencies that are sufficiently close to cause further amplification of gear whine. In one example, a conventional gear, e.g. the gear of FIG. 3 without the second aperture 184 or damper 150, and having the same weight and mass distribution, had self-coupling modes of the balance gear with the first bending mode having a resonant frequency at 3641.4 Hz, and the second twisting mode having a resonant frequency at 3643.1 Hz based on a computational analysis. The mode frequencies are sufficiently close, 1.7 Hz in the present example, that gear whine may be largely amplified.

Figure 3:
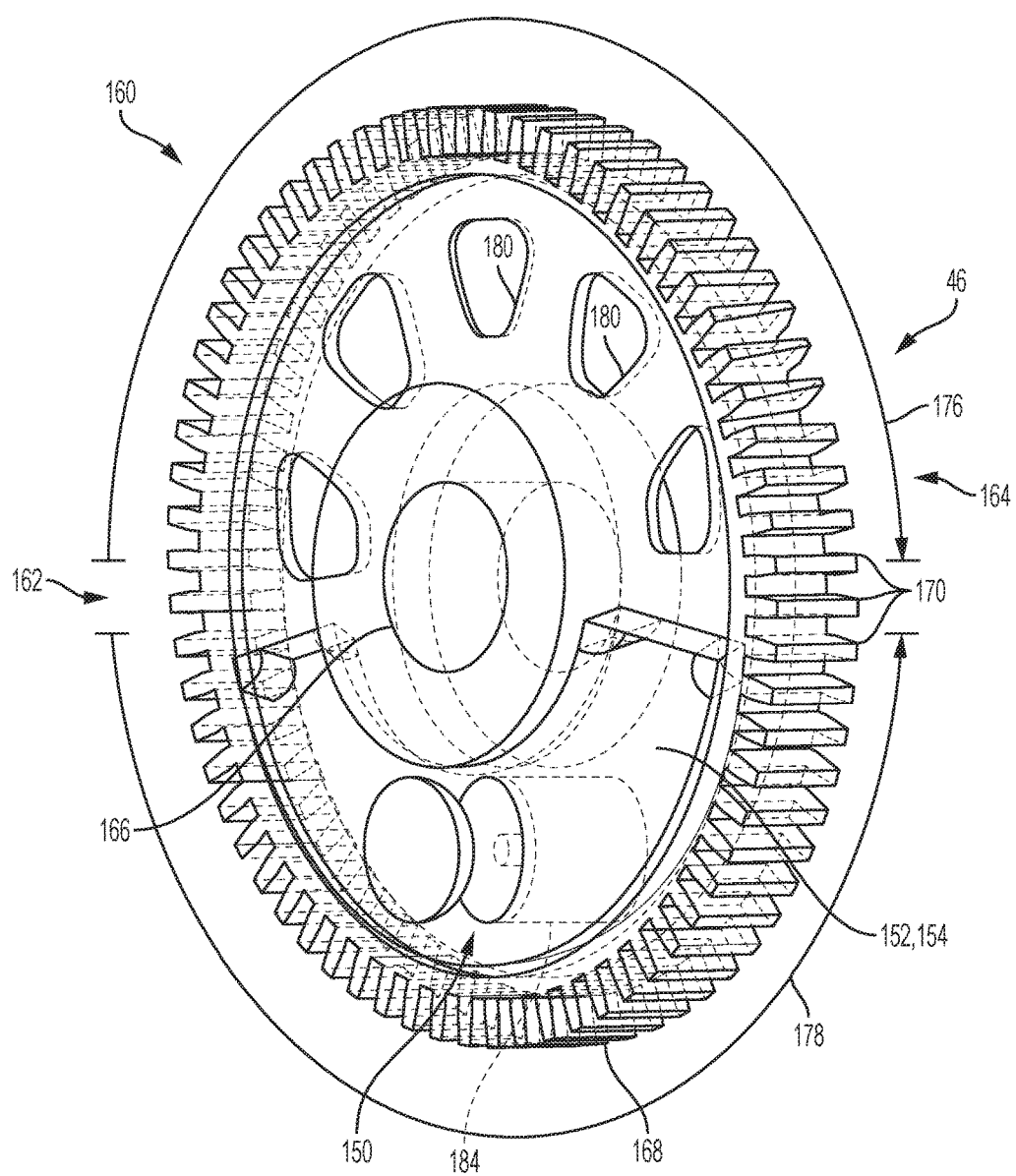
FIG. 3 illustrates an exploded view of a balance gear according to an embodiment.
Figure 7:
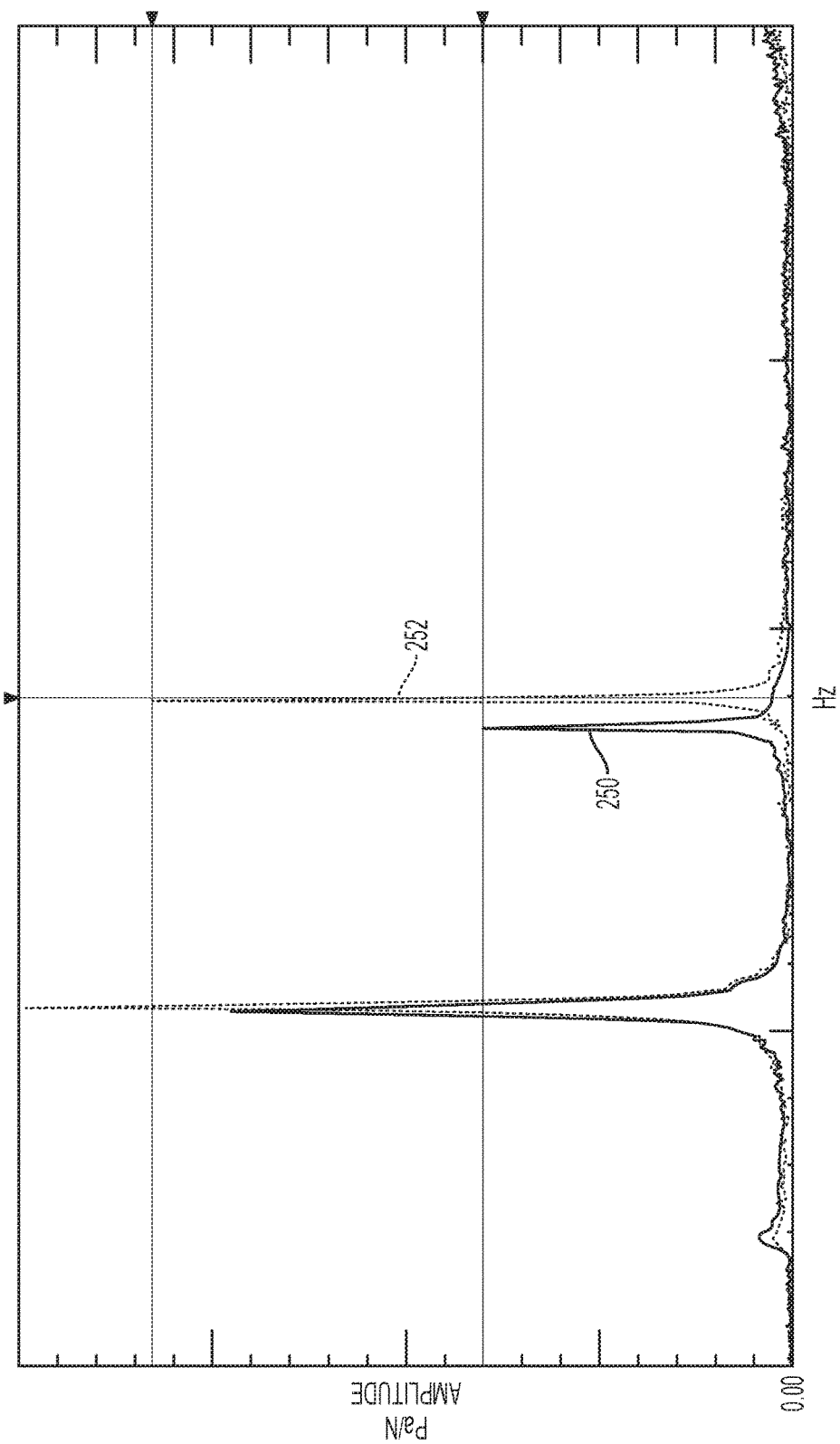
FIG. 7 is a graph providing inertance versus frequency for the balance gear of FIG. 3 in comparison with a conventional counterweighted balance gear in a first testing configuration.
Figure 8:
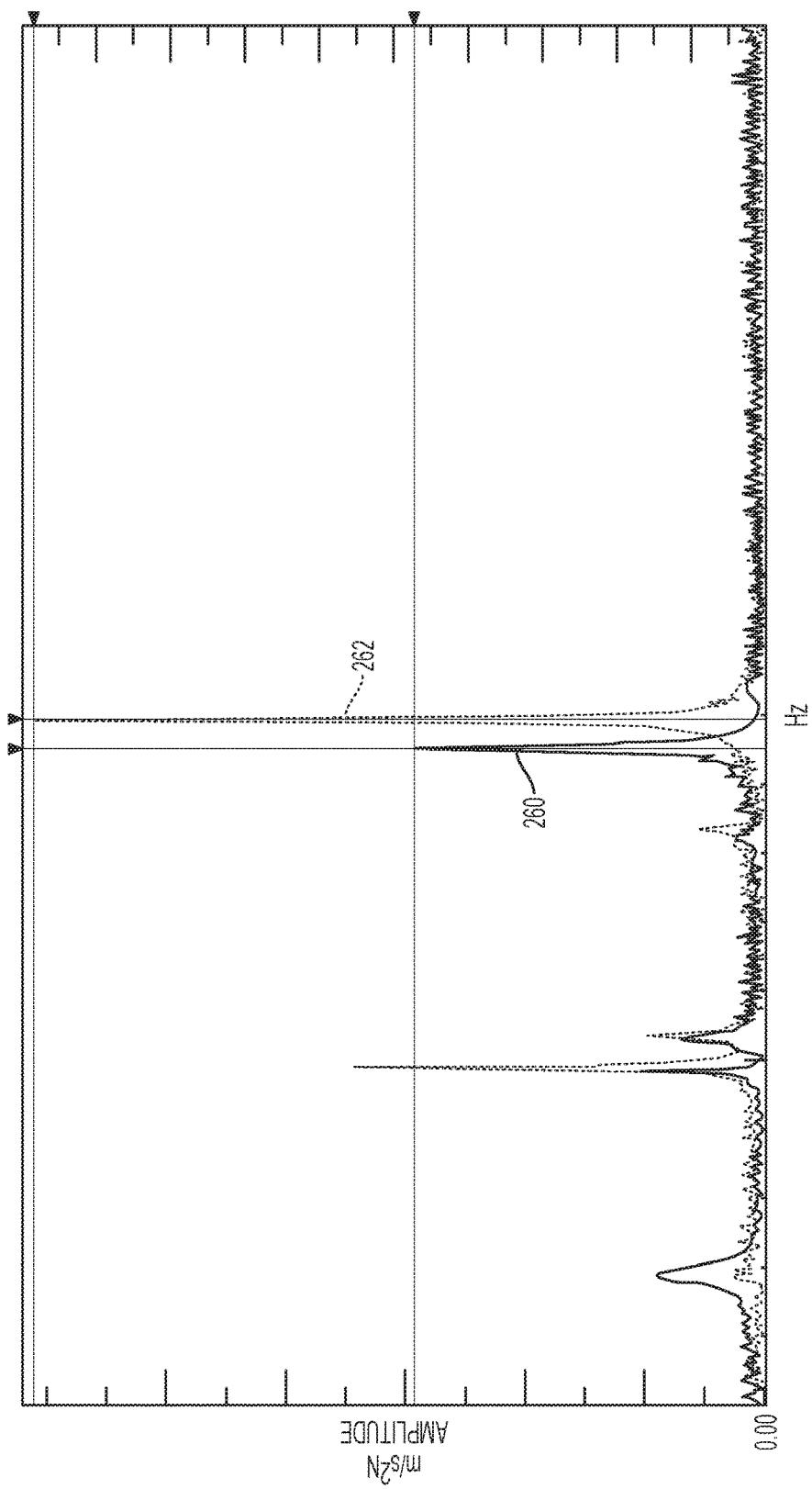
FIG. 8 is a graph providing inertance versus frequency for the balance gear of FIG. 3 in comparison with a conventional counterweighted balance gear in a second testing configuration.

The gear according to FIG. 3 with a shot damper 150 was compared to a conventional gear as described above via experimental testing in a laboratory setting. The damped gear 46 absorbed the energy of gear resonance that was excited by the bending and twisting self-coupling resonance frequencies from the gear and led to a reduction in loudness. Testing included a hammer impact on a non-rotating gear, as well as a hammer impact with a shaker excitation on the gear. Measurements were taken using a microphone and/or a laser vibrometer. The gears were tested with a hammer impact to the outer teeth of the gear at a location that was radially aligned with the damper and central bore, and opposed to the damper, as shown in FIG. 7. The gears were also tested with a hammer impact to the outer teeth of the gear at a location that was offset from a plane extending radially through the damper and central bore by an angle of thirty-six degrees, as shown in FIG. 8. As can be seen in both Figures, the resonance peak for the damped gear shown by lines 250, 260 was shifted down by approximately 80-90 Hz without the introduction of new resonant frequencies, and the amplitude of the resonant peak was decreased by approximately 6 dB in both tests compared to the conventional gear as shown by lines 252, 262.

Figure 9:
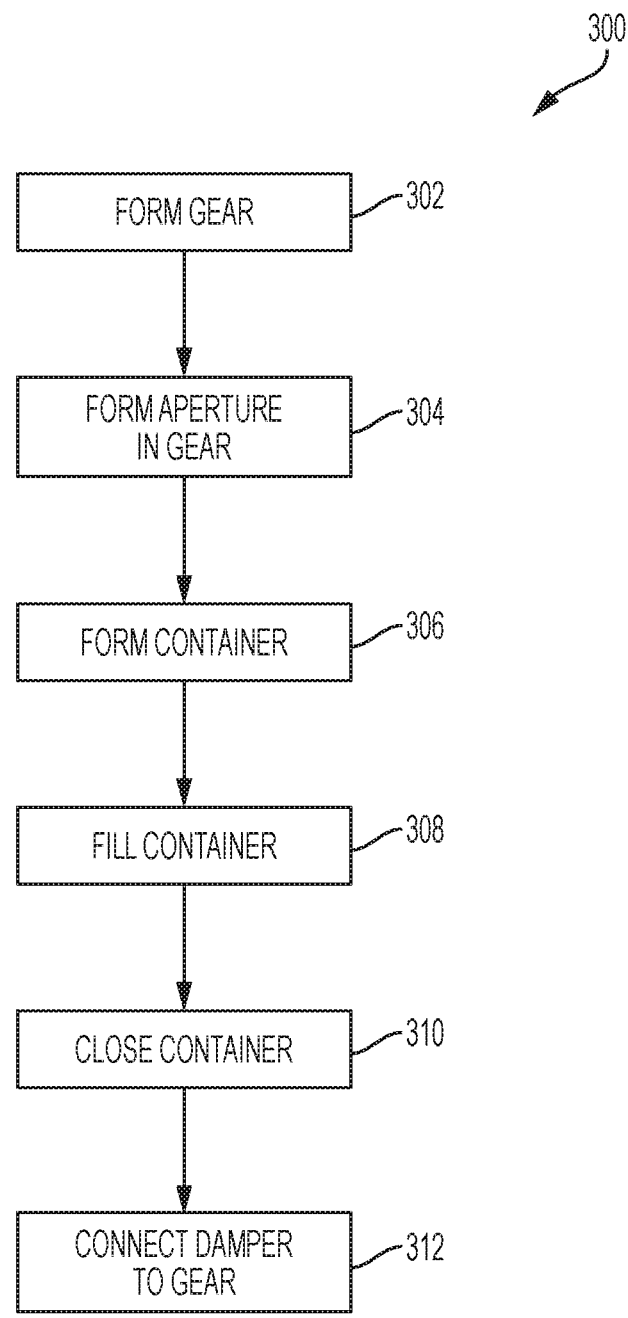
FIG. 9 illustrates a method of forming a counterbalance gear with a damper according to an embodiment.

FIG. 9 illustrates a method 300 of forming a gear such as a balance gear. The method 300 may have a greater or fewer number of steps than shown, and the steps may be rearranged to be performed in another order.

At step 302, a gear is formed. A disc is formed with first and second opposite sides 162, 164 extending radially outwardly to a circumferential edge 168. The disc may be formed by forging, die casting, net shape or near net shape die casting, investment casting, and the like. The disc may require heat treatment such as sintering, or another process. The apertures 180 in the first sector 176 may be provided and formed when the gear is formed, as a finished surface for the apertures is not required. The apertures 180 may be formed to extend through the disc and intersect the first and second sides of the disc.

A series of teeth 170 are formed into the circumferential edge 168 of the disc. The teeth may be formed or further defined via machining, including gear cutting, hobbing, gear shaping, milling, or broaching. The teeth of the gear may be further heat treated to increase their wear resistance and harden them. The disc 160 may additionally be machined using honing or another process to form the central aperture 166, and may be milled to form the mating face of the disc. If the apertures 180 in the first sector 176 are not formed when the disc is formed, the apertures may be machined into the first sector of the gear.

At step 304, an aperture 184 sized to receive a damper 150 is formed into the disc such that it intersects the first and second sides 162, 164 of the disc as a through hole. The aperture 184 is positioned between the circumferential edge of the disc and the central aperture 166. The aperture 184 may be formed after the gear itself is formed, for example, as an aftermarket or retrofit process. Alternatively, the aperture 184 may be formed when the gear disc is being manufactured, e.g. during a casting process, or by machining the aperture into the gear disc. The aperture is formed such that it is in the second sector 178 of the disc and is radially opposed to the plurality of apertures 180.

At step 306, the base 194 and the cover 200 of the container 190 are formed, for example, via casting and/or machining processes. The base 194 may be formed with the stirring member 210, or the stirring member may be separately formed and connected to the base.

At step 308, the particles 156 are measured and provided into the base 194 of the container. A specified volume of a plurality of shot particles 156 is provided into the recess 192 to a specified fill fraction. In one example, the fill fraction is 90-95 percent of the volume of the closed damper 150. The particles 156 provided are also formed with a specified diameter. In one example, the diameter is one to two millimeters. The internal volume of the damper 150, the specified fill fraction, and a diameter of shot particles 156 are sized to damp whine caused by at least second orders of distortion of the balance gear 46.

At step 310, the cover 200 is aligned relative to the base 194, and connected to the base 194 to enclose the particles 156 and close the container 190. In one example, the cover may be welded to the base. In other examples, other chemical or mechanical fastening techniques may be used.

At step 312, the damper 150 is positioned within the aperture 184 of the gear 46 with the side wall 196 in contact with or directly adjacent to the surface of the gear defining the aperture 184. In one example, the damper 150 is press fit into the second aperture 184. In another example, the damper 150 has a close fit with the second aperture 184, and is then welded or otherwise fixed in place. The damper 150 is positioned such that the end wall 198 is outboard and spaced apart from the adjacent side 164 of the disc and the edge region and cover 200 are outboard and spaced apart from the adjacent side 162 of the disc.

In other examples, the damper 150 may be assembled in place in the gear 46, such that the damper housing 194 or base is affixed to the gear within the aperture 184, the particles 156 are provided into the interior region of the housing, and the cover 200 is then affixed to the housing to enclose and form the damper in the gear.

In further examples, another aperture may be formed in the gear and be positioned radially opposite to the aperture. For symmetrically weighted gears, e.g. not a counterweight gear, another damper may be provided in the another aperture such that the dampers are symmetrically arranged relative to one another on the gear.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. An engine system comprising:
a crankshaft gear coupled to a crankshaft of an engine for rotation therewith;
a balance gear coupled to a balance shaft for rotation therewith, the balance gear formed by a disc having first and second opposite sides extending radially outwardly to a circumferential edge defining a series of teeth extending between the first and second opposite sides, the series of teeth of the disc of the balance gear in meshed engagement with the crankshaft gear, a first sector of the disc having a first aperture therethrough, and a second opposite sector of the disc having a second aperture therethrough, each of the first and second apertures intersecting the first and second opposite sides; and
a damper having a container enclosing a plurality of particles therein, the container received into the second aperture and extending across the disc.

2. The engine system of claim 1 wherein the container of the damper comprises a base having a cylindrical side wall connected to an end wall, and a cover connected to the side wall opposite to the end wall of the base.

3. The engine system of claim 2 wherein the end wall of the damper is positioned outboard of the first side of the disc, and the cover of the damper is positioned outboard of the second side of the disc.

4. The engine system of claim 2 wherein the damper further comprises a central stirring member positioned within the base, connected to the end wall, and spaced apart from the side wall.

5. The engine system of claim 4 wherein the side wall and the stirring member are concentrically arranged.

6. The engine system of claim 4 wherein the stirring member contacts the cover.

7. The engine system of claim 1 wherein the damper is the sole damper in the balance gear.

8. The engine system of claim 7 wherein the second aperture and damper are equiangularly spaced from opposite radial ends of the second sector of the disc.

9. The engine system of claim 1 wherein the container defines a container volume in an unfilled state; and
wherein the plurality of particles fills at least fifty percent of the container volume.

10. The engine system of claim 9 wherein the plurality of particles fills ninety to ninety-five percent of the container volume.

11. The engine system of claim 1 wherein the balance gear is eccentrically weighted by the first aperture in the first sector and the damper in the second sector.

12. The engine system of claim 1 wherein the plurality of particles comprises steel shot.

13. A gear for a vehicle shaft comprising:
a disc having first and second opposite sides extending radially outwardly to an edge defining a series of teeth, the disc having a first sector defining an aperture therethrough, the aperture intersecting the first and second opposite sides of the disc; and
a closed container received into the aperture and containing particles, wherein opposed ends of the container are outboard of the first and second sides of the disc.

14. The gear of claim 13 wherein the closed container has a central stirring member extending between the opposed ends.

15. The gear of claim 13 wherein the disc has a second sector defining a second aperture therethrough; and
wherein the first sector and the second sector are opposed to one another and the second aperture is empty such that the gear is counterweighted.

16. The gear of claim 13 wherein the disc has a second sector defining a second aperture therethrough, the second aperture intersecting the first and second opposite sides; the gear further comprising:
another closed container received into the second aperture and containing particles, wherein opposed ends of the another container are outboard of the first and second sides of the disc;

wherein the first and second apertures are radially opposite to one another such that the container and the another container are radially opposed to one another on the gear.

17. A method of forming a balance gear for a vehicle balance shaft comprising:
forming a disc having first and second opposite sides extending radially outwardly to a circumferential edge;
forming a series of teeth on the circumferential edge;
forming an aperture through the disc adjacent to the circumferential edge, the aperture intersecting the first and second opposite sides;
positioning a damper housing into the aperture such that the damper housing is received into the aperture, the damper housing having an interior region defined by a circumferential side wall extending from an end wall to an edge region, the side wall contacting a wall of the aperture;
providing a plurality of shot particles into the interior region of the damper housing to a specified fill fraction; and
attaching a cover plate to the edge region of the side wall of the damper housing to enclose the interior region, retain the plurality of shot particles therein, and form a damper in the balance gear.

18. The method of claim 17 further comprising forming another aperture through the disc, the another aperture radially opposed to the aperture.

19. The method of claim 17 wherein the damper housing is positioned in the aperture such that the end wall is outboard and spaced apart from the first side of the disc and the edge region is outboard and spaced apart from the second side of the disc.

20. The method of claim 17 further comprising forming the damper housing with a stirring member connected to the end wall and spaced apart from the side wall such that the stirring member extends across the interior region of the damper housing.

* * * * *